[11] 3,594,504

[72] Inventor Verne E. Munson
 Brielle, N.J.
[21] Appl. No. 824,142
[22] Filed May 13, 1969
[45] Patented July 20, 1971
[73] Assignee Bell Telephone Laboratories, Incorporated
 Murray Hill, Berkeley Heights, N.J.

[54] DIGITAL ACOUSTIC VOLUME INDICATOR
 9 Claims, 7 Drawing Figs.
[52] U.S. Cl............................................... 179/1 N,
 179/1 VL
[51] Int. Cl................................................ H04r 29/00
[50] Field of Search........................................... 179/1.7, 1
 VL; 181/.5; 324/77 B, 115

[56] References Cited
 UNITED STATES PATENTS
3,483,941 12/1969 Brady........................... 181/.5

Primary Examiner—Kathleen H. Claffy
Assistant Examiner—Horst F. Brauner
Attorneys—R. J. Guenther and Edwin B. Cave ABSTRACT: This disclosure describes a digital volume indicator that replaces a conventional VU meter for speech level measurement. The indicator operates on speech-produced peak voltages. A voltage function analogous to the dynamic meter movement characteristic of the conventional VU meters is quantized in a series of threshold detectors. Suitable gating provides for a detector output only for the highest threshold exceeded for a given analog voltage excursion. Over a specified time, the detector outputs representing the quantized peaks are characterized as by averaging in an arithmetic section to produce a representative VU reading for the speech analyzed.

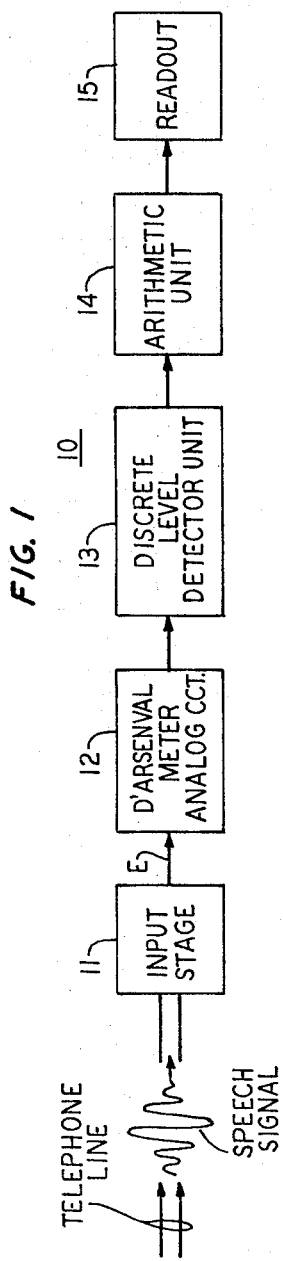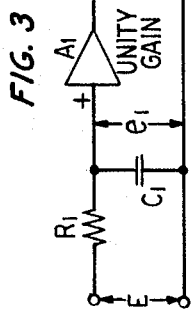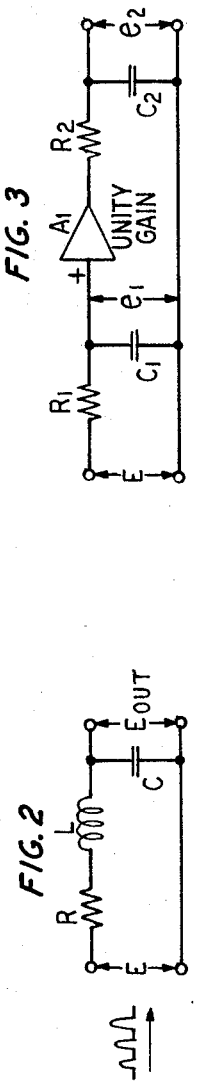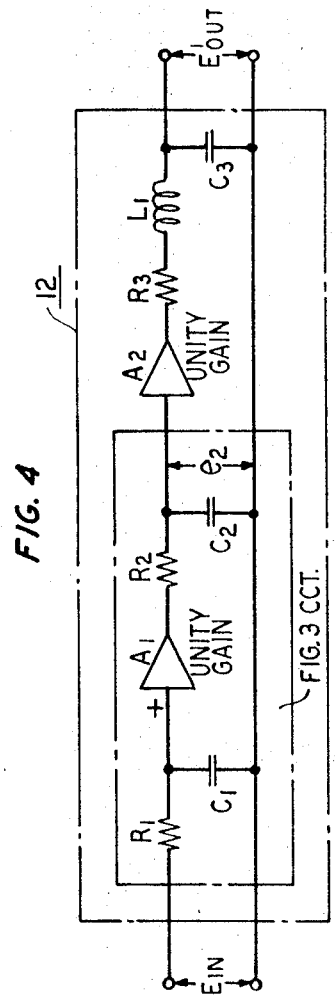

3,594,504

DIGITAL ACOUSTIC VOLUME INDICATOR

FIELD OF THE INVENTION

This invention relates generally to the field of speech characteristic measurement; and particularly concerns the measurement of speech level.

BACKGROUND OF THE INVENTION

In telephony as well as elsewhere in audio engineering it frequently is necessary to measure the levels of speech, as, for example, speech levels occurring on telephone lines. The instrument currently used to this end is termed a volume indicating (VU) meter in which the meter movement is a D'Arsonval galvanometer. Readings of the present VU meter involve visually observing a series of meter needle peak deflections in response to a speech sample, and then estimating the average needle peak deflection.

These procedures, however, subject the results to potentially wide variations even as among comparably trained operators. The requirement of an attendant is in itself a disadvantage. Moreover, as the output is not digital, a conversion to digital notation would be required for any further machine processing.

Accordingly, one principal object of the invention is to develop a volume indicator which automatical form.

Another object of the invention is to reduce or eliminate the reliance upon operators in the process of measuring speech level.

A more specific object of the invention is to facilitate the automatic reading of speech level measurements in a manner suitable for digital quantizing.

In the design of a digital volume indicator, it is desirable to duplicate as nearly as possible the ballistic characteristics of the D'Arsonval galvanometer, including the damping and overshoot characteristics.

Additionally, since operators of VU meters have been instructed to recognize only peak deflections of the needle in the earlier instrument, the readout of the digital volume indicator should for compatibility's sake be based upon a comparable process.

Accordingly, a specific object of the invention is the generation of an electrical signal with some characteristic which is the substantial equivalent of the VU meter needle position.

A further specific object of the invention is the electrical detection of speech signal peak values which correspond to successive peak deflections of a meter needle.

An additional inventive object is the combining of a series of peak amplitude values into a single value representative of the average speech level.

SUMMARY OF THE INVENTION

In broadest terms, the invention uniquely combines a meter analog circuit, a level detector circuit and a computation unit. In response to speech input, the analog circuit generates a parameter that has a characteristic that varies in time in a manner closely similar to a meter needle movement. A series of detectors follow increases in that parameter's value as it exceeds successive thresholds. Only the highest exceeded threshold is selected as that stage's output. The latter is converted to a digital code corresponding to the relative value of the speech level of the exceeded threshold.

In the computation unit, the codes are each converted into serial pulses numerically equal to the assigned value of the corresponding threshold level. The total number of pulses are stored for some selected measurement period. Concurrently, the number of codes received are also stored. Division by the latter total of the former, at the end of the measurement period, provides a measure of the average threshold level exceeded, and thus also the average speech level in the period.

The invention proceeds in part from a recognition that the torque equation that approximately describes the meter movement of the D'Arsonval galvanometer is analogous in form to the familiar second order differential equation for charge stored in a capacitor in a series RLC circuit.

In a particular embodiment, one detector is provided for each volume unit in the range −9 to +3, which corresponds to the range in most existing volume indicator meters. Also, it has been found that, for the application at hand, the most satisfactory formula for converting a succession of output pulses to a single volume unit value involves a straight averaging of all peaks. Other means for deriving a composite measure from the voltage peaks of the desired volume unit value can include weighting, discounting, selection of the median or mean pulse, etc.

A fuller understanding of the invention and its further objects, features and advantages will be gained from a reading of the detailed description to follow of an illustrative embodiment.

THE DRAWING

FIG. 1 is a functional block diagram of the successive steps and circuits which comprise the inventive embodiment;

FIGS. 2—4 are circuit diagrams of meter analog circuits;

DETAILED DESCRIPTION OF AN ILLUSTRATIVE EMBODIMENT

Figure 5:
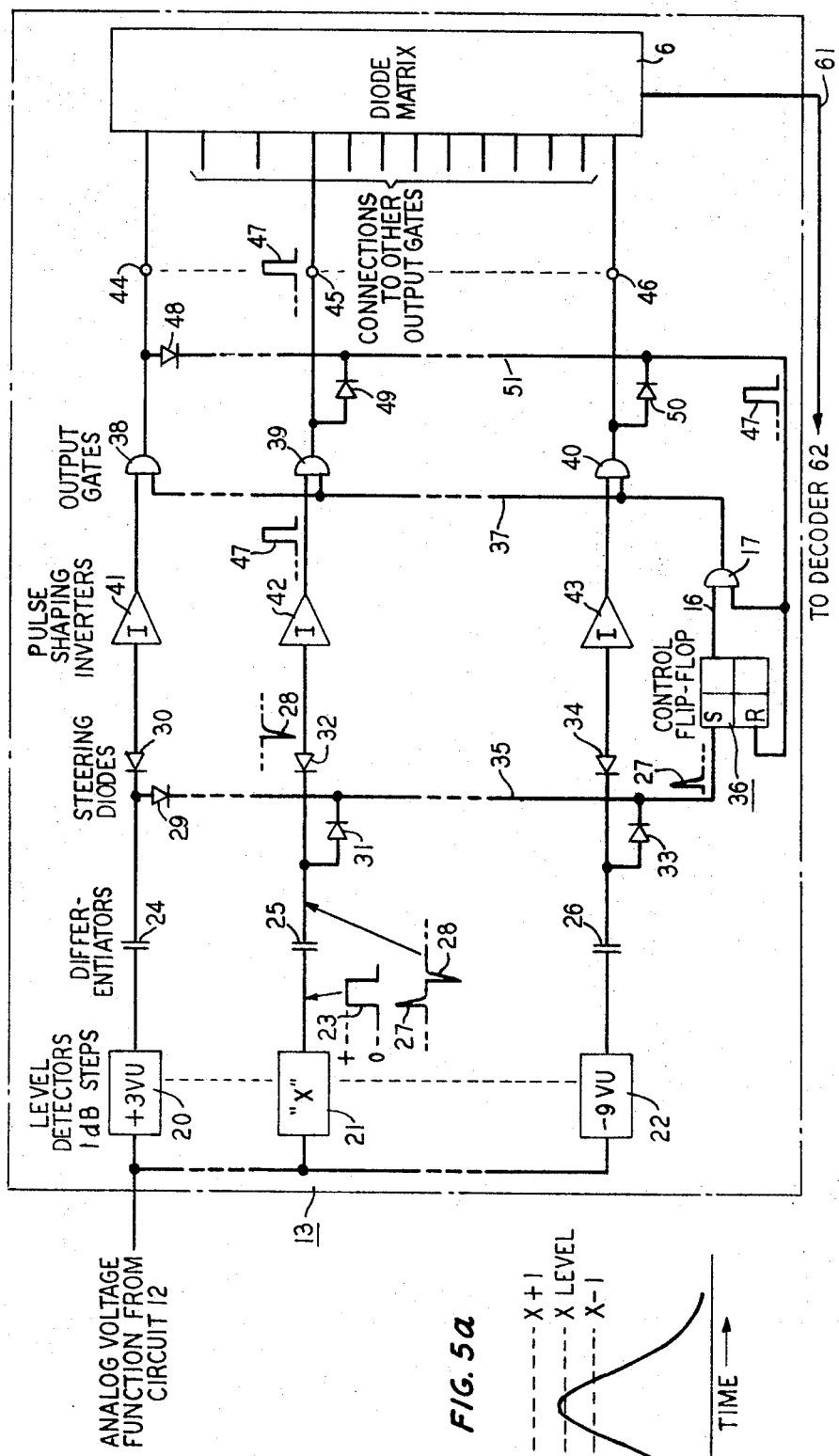
FIG. 5 is a functional block diagram of the level detector unit.

A general description of the overall design of the digital volume indicator is afforded by the block diagram of FIG. 1. The input stage 11 receives speech signals present, for example, on a telephone line, providing high input impedance and amplification, as well as full-wave rectification to convert the AC current speech signal into pulsating DC The output signal, of stage 11, denoted E is delivered to analog circuit 12 which generates an electrical function, for example, a voltage analogous to volume indicator meter needle movements.

The voltage function in analog circuit 12 is monitored and quantized by level detectors in unit 13. There typically are 13 level detectors in unit 13 which cover a 13db. range in 1db. steps. For each occurrence of an analog voltage peak, unit 13 generates an output indicative of the peak's magnitude. These are converted in arithmetic unit 14 into binary form and stored. Also, each level detector output is recognized as an event; and the number of such events are also stored. The magnitudes of the several level detector outputs are totaled and divided by the number of events, which yields for the time span in question an average peak amplitude reading. The latter is then fed to the readout section 15 which provides temporary storage and conversion from binary to decimal format for the quotient counts. The latter, which is the measure of the input signal in volume units, are displayed in numerical form in suitable VU increments.

D'Arsonval Meter Analog Circuit

By way of background, the needle movement of a D'Arsonval meter can be approximately described by the following torque equation:

$$J\frac{d^2\theta}{dt^2}+D\frac{d\theta}{dt}+S\theta=\frac{S}{K}I \qquad (1)$$

where:

$J \equiv$ moment of inertia
$D \equiv$ air plus circuit damping coefficient
$S \equiv$ spring constant
$\theta \equiv$ angular displacement
$K \equiv$ instrument constant
$I \equiv$ current Equation (1) in form is analogous to the familiar second order differential equation for charge stored in a capacitor in a series RLC circuit, such as shown in FIG. 2. For this circuit the charge equation is $$L\frac{d^2q}{dt^2} + R\frac{dq}{dt} + \frac{q}{C} = E \qquad (2)$$

where:

$q \equiv$ the instantaneous charge in the capacitor. In equations (1) and (2), the stored charge $q$ can be regarded as the analog of $\theta$, the needle's angular displacement.

For the circuit of FIG. 2, a solution for equation (2) is realized by considering the necessary constraints to determine values of the analog circuit.

In particular, sudden application of a single frequency signal of amplitude such as causes a zero final needle position shall result in a needle deflection to 99 percent of the final value within 300±30 msec. Secondly, overshoot shall be restricted to a minimum of 1.0 percent and maximum of 1.5 percent.

The FIG. 2 circuit, however, requires an impractical inductor with constant $L$ and $R$ over an unduly wide frequency range. The desired function can nevertheless be realized through the use of RC circuitry in combination with a unity gain amplifier with extremely high input impedance. Such a circuit is depicted in FIG. 3 and may be analyzed as follows:

The Laplace transformation for a unit step function applied to the RC integrator network $R_1C_1$ is given:

$$e_1(S) = \frac{E}{S(SR_1C_1+1)} \qquad (3)$$

where $S$ is the complex frequency operator.

If a second integrator network consisting of resistor $R_2$ and capacitor $C_2$ is cascaded to the first network via a unity gain buffer amplifier $A_1$, and assuming values of $R_1 = R_2 = R$ and $C_1 = C_2 = C$, then the voltage output $e_2$ is given by:

$$e_2(S) = E\left[\frac{1}{S} - \frac{RC}{(SRC+1)} - \frac{RC}{(SRC+1)^2}\right] \qquad (4)$$

When the inverse Laplace transformation is applied, this equation may be rewritten as:

$$e_2(t) = E\left[1 - e^{-\frac{t}{RC}} - \frac{t}{RC}e^{-\frac{t}{RC}}\right] \qquad (5)$$

Now, it will be recognized that the critical damped solution for equation (2) is:

$$q = q_s(1 - e^{-\alpha t} - \alpha t e^{-\alpha t}) \qquad (6)$$

where $q_s \equiv$ charge in the steady state and $\alpha = \frac{R}{2L} = \sqrt{\frac{1}{LC}}$ Equation (6) leads to the solution of $\alpha$ by imposing the constraint that the VU meter deflection (or equivalently, the capacitor charge) should reach 99 percent of its steady state value after 300±30 msec. of single frequency tone is applied.

It will be noted that equation (5) is identical in form to that of the charge equation (6). If the $RC$ product of equation (5) is made to equal $1/\alpha$, then the output voltage $E_{out}$ of the FIG. 2 circuit and the output voltage $e_2$ of the circuit of FIG. 3 will be identical.

A closer matching to actual VU meter responses is achieved by the circuit of FIG. 4. This circuit is constructed by feeding the output $e_2$ of the FIG. 3 circuit through the circuit consisting of unity gain amplifier $A_2$ and the RLC network consisting of resistor $R_3$ and inductor $L_1$ in series relation and capacitor $C_3$ in parallel relation therewith.

Thus, in the analog unit an electrical function is generated that is analogous, i.e., linearly related or identical in response characteristic, to a derived volume unit meter deflection function. The electrical function advantageously is a voltage produced in accordance with the preferred circuitry of FIG. 4. Laboratory measurement of the response of the analog circuit of FIG. 4 has been compared with a composite response curve constructed by averaging plotted points for several conforming volume unit meters; and the correspondence between the two curves has been found to be good.

Level Detection

The analog voltage function from circuit 12 is fed to a parallel array of threshold or level detectors depicted in FIG. 5. Only three detectors 20, 21, 22 are shown. Advantageously, a total of thirteen threshold detectors provide a threshold for each volume unit in the range −9 to +3, which range corresponds to the scale on most VU meters.

Figure 5A:
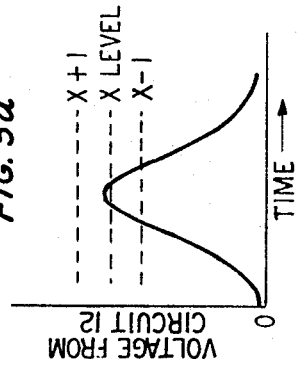
FIG. 5a is a graph depicting the voltage vs. threshold response for the level detectors.

As the threshold of a given detector such as 20 is exceeded in response to an increasing voltage input, that detector generates an output. For example, as illustrated also in FIG. 5a, detector 21 responds to an analog voltage level which corresponds to a VU level of "X", the general case. Normally while the voltage input ascends toward the response threshold of detector 21, its output is zero. As the threshold of detector 21 is exceeded, its output shifts to a positive voltage denoted by the pulse 23. The width of pulse 23 is determined by the time that the amplitude of the voltage input exceeds the threshold of detector 21. The output of detector 21 is differentiated by capacitor 25, which results in the positive pulse 27 at the time the threshold of detector 21 is exceeded, and the negative pulse 28 when the input voltage from circuit 12 drops below the threshold of detector 21.

In similar fashion, each of the 13 level detectors, including the detectors 20 and 22 which are shown, respond to a particular voltage level of the analog voltage function. The capacitors 24 and 26 perform similarly to capacitor 25. By a network of steering diodes associated with each level detector, such as the diodes 29, 30, 31, 32, 33, 34 positive pulses such as 27 are gated through line 35 to the control flip-flop 36. The first positive pulse received sets flip-flop 36, which then applies a signal through line 16 to gate 17 and onto 37 to open each of the output gates as for example, the output gates 38, 39 and 40 associated with detectors 20, 21, and 22 respectively. As long as positive pulses such as 27 are gated to flip-flop 36, however, the steering diodes such as 30, 32 and 34 prohibit any inputs to the gates 38, 39, 40.

When the analog voltage from circuit 12 starts to decrease, a negative output such as pulse 28 is generated in the manner described. The negative pulse occurs first in that level detector which experienced the highest exceeded threshold. If detector 21 were that detector, then the first pulse generated, namely pulse 28, passes through steering diode 32, and into pulse-shaping inverter 42 which converts the negative-going differentiated waveform into a positive-going square wave pulse 47 suitable for subsequent logic operations. Inverters 41 and 43 perform similarly. The shaped pulse 47 next feeds through the open output gate 39 to output terminal 45.

The output pulse 47 is also gated through diode 49 and line 51 to reset flip-flop 36. Flip-flop 36 in response removes the signal from line 16 to gate 17. The pulse 47 on line 51 is also applied to gate 17 to maintain the signal status on line 37. At the end of pulse 47, gate 17 applies a signal through line 37 to close the output gates. Since the gates are closed, no further output from the output gates occurs. Thus the pulse 47 corresponding to the highest threshold exceeded is the only output pulse permitted until the analog voltage from circuit 12 begins to rise again.

The output of detector unit 13 is a succession of pulses on the 13 output terminals, each pulse corresponding to the occurrence of a peak in the analog voltage amplitude with the particular terminal designating the actual value of the peak analog voltage. For convenience in the subsequent arithmetic operations, arbitrary values of 1 through 13 are assigned to the respective level detector output. Thus to the lowest level of the detector namely level detector 22 a numerical value of 1 is assigned; the next lowest level detector is assigned a value of 2 and so on, the highest level being assigned the value of 13. The several outputs of detector unit 13 are converted to binary form thus in conventional diode matrix 6.

Figure 6:
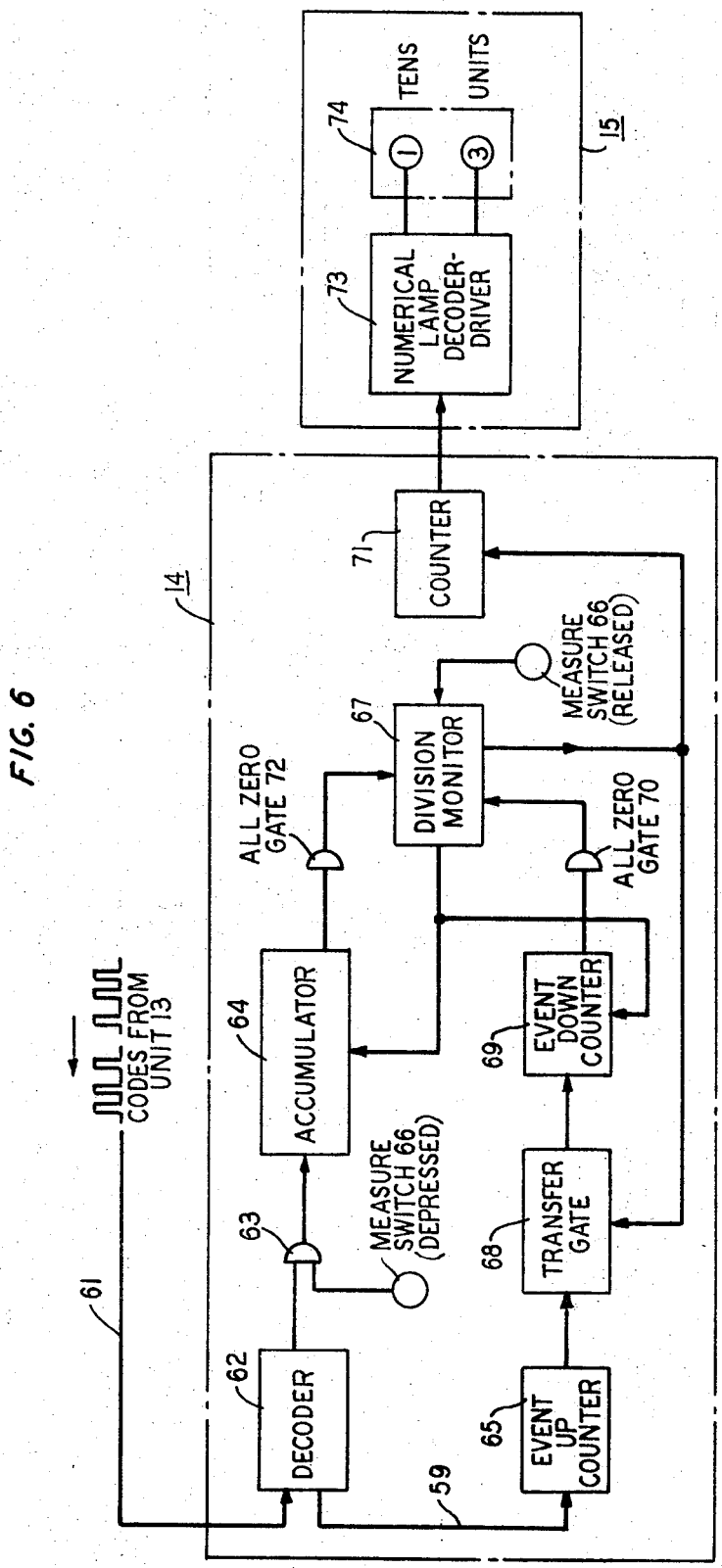
FIG. 6 is a functional block diagram of the arithmetic unit.

With reference now to FIG. 6, the outputs of diode matrix 6 is a series of four-level codes, each code corresponding to one of the threshold levels of detector unit 13. These codes are transmitted along line 61 to the decoder 62. Decoder 62 converts the code received into a corresponding serial string of pulses, the number of pulses being equal to the decimal number represented by the particular code received. The pulse train outputs of decoder 62 are fed through gate 63 to a binary counter of accumulator 64, where they are stored. Gate 63, operated either manually or on a duty cycle basis, provides a control over the beginning of the measuring period. Operation of gate 63 is in the present embodiment achieved through manual measure switch 66.

Additionally for each output generated by detector unit 13, a single pulse developed in decoder 62 is fed through line 59 to binary or event-up-counter 65, which stores a running total of the events received, equal to the number of occurrences of analog voltage peaks.

At the conclusion of the desired measuring period, as signified by release of measure switch 66, a conventional division of the contents of accumulator 64 by the contents of event-up-counter 65 is commenced. Division monitor circuit 67 enables transfer gate 68, allowing event-up-counter 65 to transfer its contents to event-down-counter 69. Thereafter circuit 67 directs accumulator 64 and event-down-counter 69 to count-down in unison. When counter 69 reaches zero, the all-zero gate 70 pulses monitor 67, which in turn enables transfer gate 68 again and also pulses counter 71. Counter 71 stores the pulse.

Successive fillings of the event-down-counter 69 and count-down of the contents of accumulator 64 against that of counter 69 result in pulsing of counter 71 for each such event. When the contents of accumulator 64 is zero, all-zero gate 72 pulses division monitor circuit 67 to halt the process. The contents of counter 71, representing the quotient is utilizable as a recording in digital form for later machine processing. Alternatively, as in FIG. 6, the quotient is gated to numerical lamp decoder-driver 73 which drives visual display 74. It can thus be seen that the contents of accumulator 64 have been divided by the contents of event-up-counter 65 by the process of subsequent subtraction and that the contents of counter 71 is the average of the peak values of the input analog voltage. Of course, account must be taken in the decoding process, before display on the lamps, to reconcile the assignment of the arbitrary values 1 through 13 for the conventional meter scale range of −9 to +3.

Persons skilled in the art will appreciate that numerous alternate schemes can be enlisted to achieve the required computations and display. Further, the analog circuit 12 can assume other forms such as active filters, while accomplishing the same ends. Operational amplifiers can be adopted as level detectors in unit 13.

The spirit of the invention is embraced in the scope of the claims to follow.

What I claim is:
1. Acoustic level indicating apparatus comprising:
first means for receiving acousto-electric signal peaks, detector means having plural discrete levels corresponding numerically to uniform volume unit steps, second means for generating and storing a binary output unique for each level in response to receipt of each peak by the appropriate level detector, third means for separately summing said outputs and the total peaks received, means for arithmetically dividing the summed outputs by the summed total peaks received, and means for utilizing the resulting quotient.

2. Circuitry for measuring speech volume units comprising:
means for converting a received electrical speech signal into a voltage function linearly related to a selected volume unit meter needle deflection function;
a voltage peak detector comprising a plurality of discrete level detectors with successively greater threshold responses for quantizing said voltage function and producing for each excursion thereof an indication of the highest said threshold exceeded;
means for transforming each said indication into a train of pulses numerically related to the value of the highest exceeded threshold;
means for summing all pulses in a selected succession of such trains, and for summing the number of pulse trains selected;
means for dividing the pulse sum by said number of trains; and
means for utilizing the resulting quotient.

3. Circuitry as in claim 2, wherein said converting means comprises a circuit consisting of first and second integrator networks cascaded via a buffer amplifier of unity gain.

4. Circuitry as in claim 3, further including a loop consisting of a second unity gain amplifier, a resistive element and an inductive element, said loop being connected to the output of said second integrator network, and a capacitive element connected in parallel relation to said last-named output.

5. Circuitry as in claim 3, further comprising means for full-wave rectifying said received electrical signal prior to receipt thereof by said converting means.

6. Circuitry as in claim 5, wherein said level detector thresholds are calibrated to correspond to whole number levels in a volume unit range of substantially −9 to +3 VU.

7. Circuitry in accordance with claim 6, wherein said utilizing means comprises means for displaying the numerical value of said quotient.

8. Circuitry for measuring speech volume units comprising:
means for converting a received electrical speech signal into a voltage function linearly related to a selected volume unit meter needle deflection function;
a voltage peak detector comprising a plurality of discrete level detectors with successively greater threshold responses for quantizing said voltage function and producing for each excursion thereof an indication of the highest said threshold exceeded;
means for transforming each said indication into a train of pulses numerically related to the value of the highest exceeded threshold;
means for deriving, from the pulses and pulse trains so generated within a given time span, a composite measure reflective of the voltage peaks detected; and
means for utilizing the composite measure.

9. Circuitry as in claim 8, wherein said utilizing means comprises means for numerically displaying the value of said composite measure.